March 12, 1957 J. B. ORRELL 2,784,681
TWO-FLAVOR FILLING UNIT FOR ICE CREAM CONES AND THE LIKE
Filed May 20, 1954 4 Sheets-Sheet 1

INVENTOR.
Joseph B. Orrell.
BY
Albert J. Fihe
ATTORNEY.

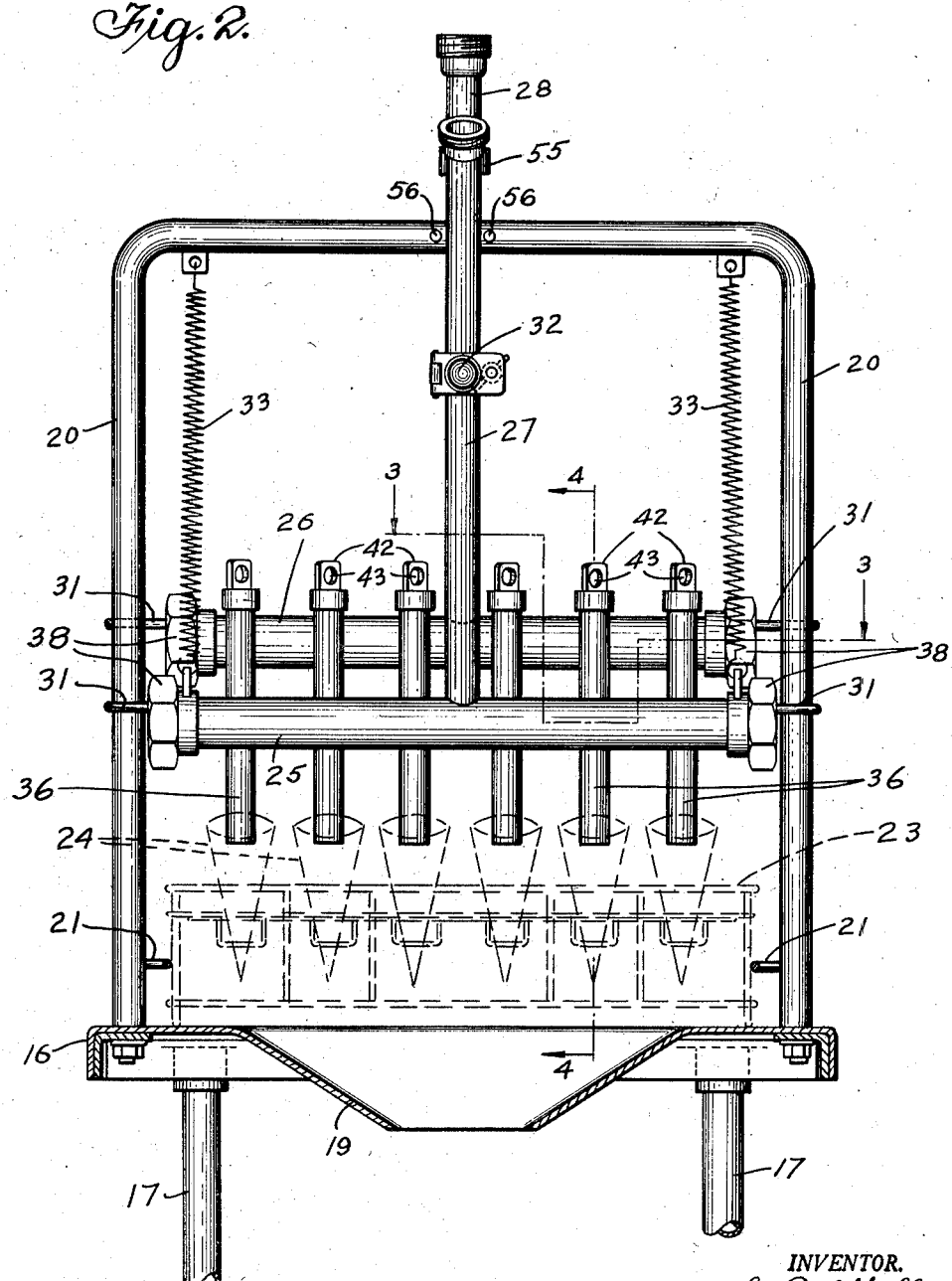

March 12, 1957 J. B. ORRELL 2,784,681
TWO-FLAVOR FILLING UNIT FOR ICE CREAM CONES AND THE LIKE
Filed May 20, 1954 4 Sheets-Sheet 3
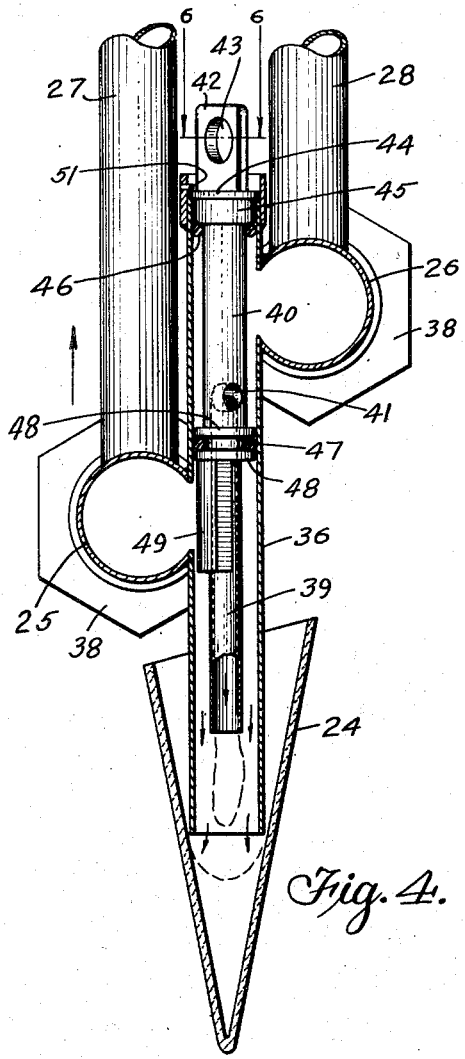
Fig. 4.
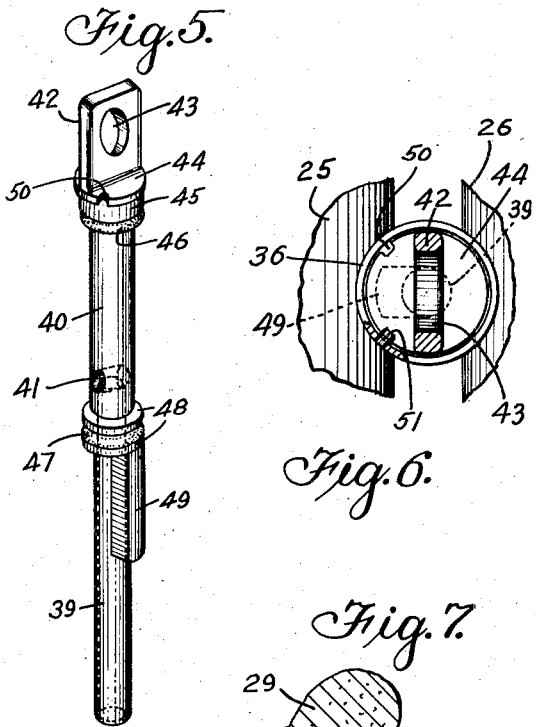
Fig. 5.
Fig. 6.
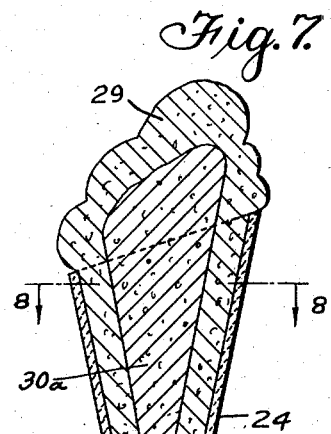
Fig. 7.
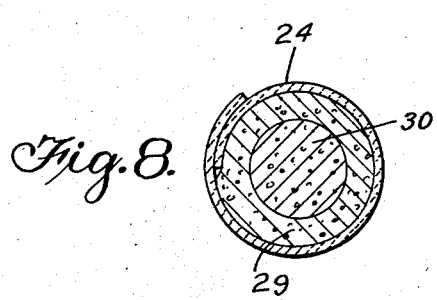
Fig. 8.
INVENTOR.
Joseph B. Orrell.
BY
ATTORNEY.

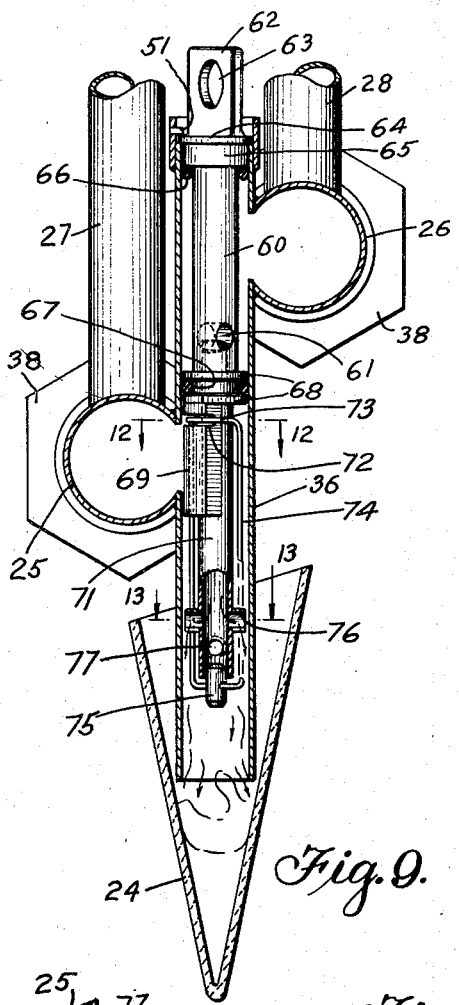
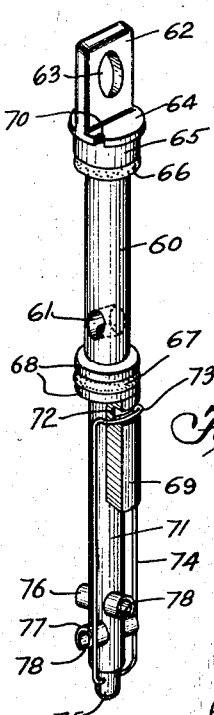
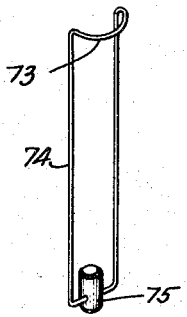
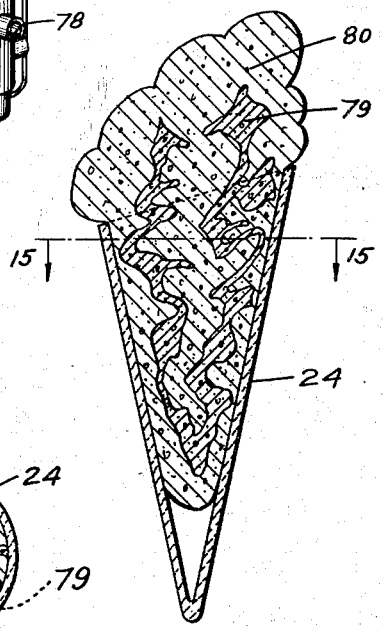
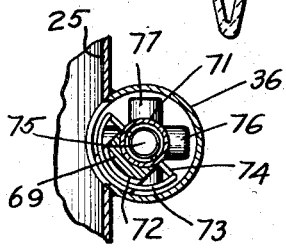
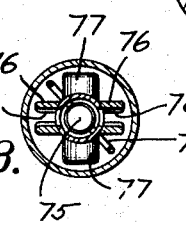

United States Patent Office 2,784,681
Patented Mar. 12, 1957

2,784,681

TWO-FLAVOR FILLING UNIT FOR ICE CREAM CONES AND THE LIKE

Joseph B. Orrell, Los Angeles, Calif.

Application May 20, 1954, Serial No. 431,150

7 Claims. (Cl. 107—1)

This invention relates to a two-flavor filling unit for ice cream cones and the like, and relates particularly to the production of ice cream cones and similar confections in quantities for freezing and packaging, and later distribution.

One of the important objects of this invention is to provide means and mechanism for simultaneously inserting two flavors of ice cream, sherbet or other similar materials into a receptacle such as the commonly known "cone," and which will produce either a variegated design or a simple two part package having a single core and an outside portion of different flavor or material.

One of the principal objects of this invention is to provide means for embodying a material of one kind, such as one flavor of ice cream, a sherbet or even a fluid syrup or other "center" material into a quantity or portion of ice cream or other similar material, and inserting the same into a container, either an edible container or one of paper, cardboard or the like.

Yet another important object is the provision of a two pattern package or unit of ice cream or the like by means of a mechanism whereby the same is expeditious, economical and productive of little, if any, waste.

In carrying out the invention, the two materials are mechanically inserted into the container by a manual operation of the inserting mechanism when the materials are in a semi-solid or "half frozen" condition. The packaged elements are then subjected to a lower temperature, and as the ice cream hardens, the entire body with its flavoring and decorative center becomes quite stiff and solid, thereby holding its shape throughout packaging and further handling, such as distribution and actual consumption.

Other and further important objects of the invention will be apparent from the disclosures in the accompanying drawings and following specification.

The invention, in a preferred form, is illustrated in the drawings and hereinafter more fully described.

In the drawings:

Figure 2 is a front elevation of the structure illustrated in Figure 1 showing a plurality of filling units which are simultaneously operated.

Figure 4 is an enlarged detail view showing the two-flavor filling unit of this invention with parts broken away to illustrate more clearly the interior construction of the mechanism and the actual operation. This figure is a section along the line 4—4 of Figure 2.

Figure 5 is a perspective view of the inside filling element of the structure illustrated in Figure 4.

Figure 6 is an enlarged horizontal section taken on the line 6—6 of Figure 4.

Figure 7 is a vertical sectional view of one type of ice cream cone filled with two flavors or types of material in accordance with the principles and by the mechanism of this invention.

Figure 8 is a section on the line 8—8 of Figure 7.

Figure 9 is a vertical view partly in section, somewhat similar to the showing of Figure 4, but illustrating a modification of the invention.

Figure 10 is a perspective view of the inside filling element of the structure of Figure 9, and this corresponds in some respects to the inside filling element shown in Figure 5.

Figure 11 is a detail perspective view of the closure element for the lower end of the filling element of Figure 10, and showing its stirrup-like supporting means.

Figure 12 is an enlarged horizontal section on the line 12—12 of Figure 9, looking downwardly.

Figure 13 is also a slightly enlarged section and is taken on the line 13—13 of Figure 9, looking in the direction indicated.

Figure 14 is a vertical section somewhat along the lines of the showing of Figure 7, but illustrating a variegated or "marbled" design, illustrating the introduction of revel, sherbet or the like into the main body of ice cream.

Figure 15 is a horizontal section on the line 15—15 of Figure 14.

As shown in the drawings:

Figure 1:
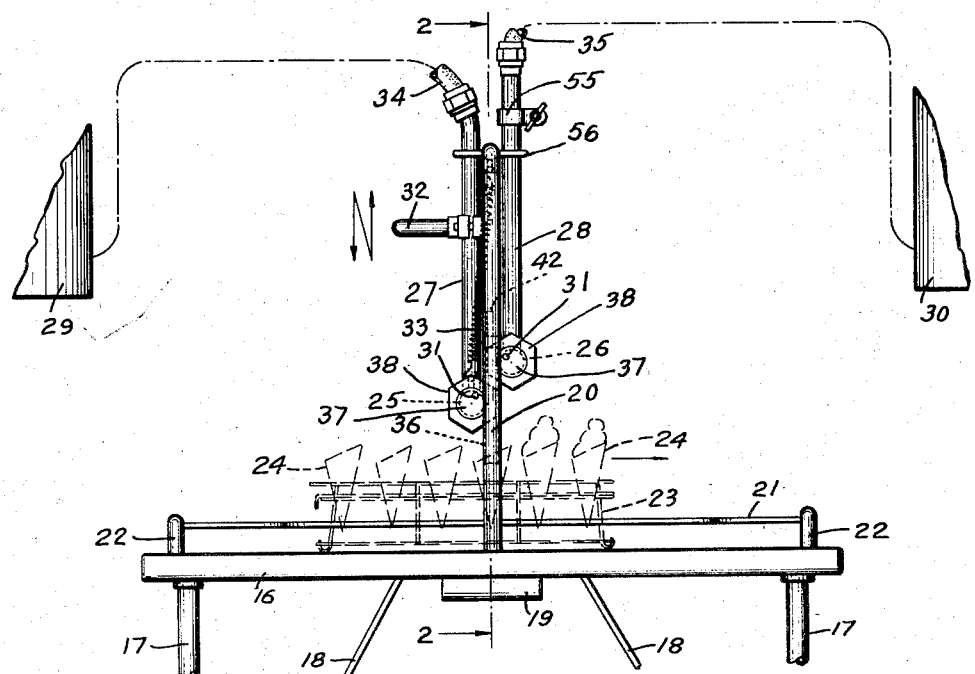
Figure 1 is a side elevation of the improved two-flavor filling unit of my invention showing diagrammatically the sources of supply of the distinctive materials, and also illustrating one type of container to be filled.
Figure 3:
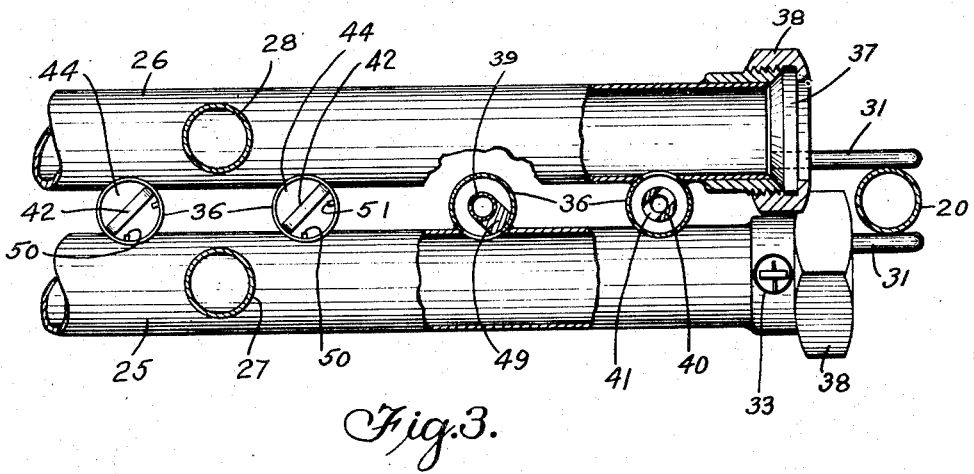
Figure 3 is an enlarged sectional view taken on the broken line 3—3 of Figure 2 looking in the direction indicated by the arrows.

The reference numeral 16 indicates generally a table or platform upon which the two-flavor filling unit of this invention is mounted. This table or platform is supported by legs or the like 17 and braces 18. The table has a central depression 19 open at the bottom for catching and handling of any overflow or accidentally spilled material.

An inverted U-shaped stand 20 is fixed into the table top and extends thereabove to a desired height. Guard rails 21 mounted on supports 22 extend along the sides of the table to insure proper positioning and slidable movement of a cone-holding cage or basket 23, which, as best shown in Figures 1 and 2, is adapted to support, for a filling operation, a number of cones 24, which in the present device totals thirty-six.

Slidably suspended in the U-shaped support 20 is a pair of filling pipes or headers which extend horizontally across the support, the pipe for one material, such as ice cream, being designated by the reference numeral 25, and the pipe for the other material such as custard, spumoni, sherbet or the like being designated by the reference numeral 26. Each of these pipes is connected centrally to a vertical supply pipe or line 27 and 28 respectively, which in turn are fed from sources indicated diagrammatically and marked with the reference numerals 29 and 30 respectively. Guide bars 31 extend from the ends of the pipes 25 and 26 and contact the corresponding portions of the U-shaped bracket 20 so that the supply pipes and appurtenances are always maintained in proper operative position. A handle 32 is affixed to the ice cream pipe 27, by means of which the units 25–28 inclusive can be moved upwardly and downwardly as indicated by the arrows adjacent the handle 32 in Figure 1. Tension springs 33 support these elements and tend to return the same to a normal up position, as shown in Figure 1. The connections 34 and 35 from the pipes 27 and 28 to the sources of supply 29 and 30 respectively are flexible so as to allow a proper freedom of movement of the filling unit elements.

The horizontal feed pipes 25 and 26 are at different levels as best shown in Figures 2 and 4, and the two pipes are connected at spaced intervals by a series of six vertical tubes or nozzles 36.

One of these tubes is shown in more detail in Figure 4 and it will be noted that the horizontal pipes 25 and 26 are provided with openings leading into the vertical tubes 36. The vertical tubes 36 are of such a length and are so proportioned with respect to the remainder of the apparatus that at the extreme of their downward movement when propelled by the handle 32, the lower end of these tubes will just contact the corresponding portions of a cone or cones 24 mounted in the basket or cage 23 on the table 16. A suitable adjustable stop 55 which contacts the pins 56 is provided for limiting the downward movement of the filling mechanism 25–36 inclusive. The horizontal pipes 25 and 26 are provided with removable end closures, caps or plugs 37 held in position by interiorly screw-threaded hexagon rings 38 for purposes of ready disassembly for cleaning. The guide bars or pins 31 are press fitted into the caps or plugs 37 so that proper contact with the support 20 can be adjustably maintained.

Slidably and removably mounted in each of the vertical tubes 36 is a fill control valve element comprising essentially a tube 39 of approximately one half the diameter of the tube 36 and this is fitted on to the lower end of a bar 40 which has a transverse opening 41 therein communicating with the upper end of the tube 39. The tube 39. The tube bar combination 39—40 is provided with an upper extension 42 having an opening 43 therein so that it may be readily grasped for insertion and removal operations. An annular flange 44 of a slightly greater diameter than the diameter of the bar 40 is adjacent the lower end of the handle 42 and slidably fits inside the upper end of the tube 36. Just beneath the flange or disc 44 is an enlargement 45 of the bar 40 which supports and positions an O-ring 46 for sealing purposes. Another O-ring 47 is affixed at the lower end of the bar 40 and is mounted between two annular flanges 48 to insure proper positioning. Depending from the lower flange 48 and affixed to the exterior of the tube 39 is a longitudinal protuberance 49 which acts as a valve element to control the influx of ice cream or similar material from the tube 27 and pipe 25 into the space between the tubes 36 and 39. This control is accomplished by a simple turning of the handle 42. A notch 50 (Figure 6) is cut into the periphery of the flange 44 and a pin 51 is fitted into the upper end of the tube 36. This pin projects inwardly and the notch 50 in the flange 44 is of a size to permit the pin to pass through it when the element of Figure 5 is inserted into the tube 36. The unit of Figure 5 is then held in desired position in the tube 36 having been slightly turned away from the juxtaposition of the notch 50 and the pin 51 which at the same time allows of an adjusting movement of almost 360° for control of the influx of material from the pipe 25.

Likewise material from the pipe 26 enters the tube 36 in the space between its upper end and the bar 40 on the element of Figure 5. This material passes through the opening 41 and into the tube 39, both materials then flowing downwardly under a controlled pressure and into the cone 24, all as best shown by the arrows in Figure 4.

The operator moves the combination of pipes and tubes downwardly into an alignment of six cones preliminarily positioned in the cage or basket 23 and on the table 16 against the tension of the springs 33 and as the two materials 29a and 30a from the containers 29 and 30 respectively, fill the cone, the operator simply allows the springs to pull the apparatus upwardly until the cones are filled to the desired degree, as best shown in Figure 7. When the fill pipes and tubes are pulled away from the cone after filling the same, the material 29a comprising the outer layer is usually pulled upwardly and falls inwardly, thereby more or less covering the inside material 38. This does not invariably happen however, and the result depends in some degree upon the speed and skill of the operator. When the cones are thus filled, the operator quickly moves the cage or basket forward one step on the table between the guide bars 21, as shown by the arrow in Figure 1, when the next set of six cones is filled and the operation thereafter is practically continuous.

The modification illustrated in Figures 9–15 inclusive relates to the production of a mottled, variegated or marbled design of the two filled ingredients as distinguished from the separately defined portions previously described and shown in Figures 7 and 8.

In this arrangement, the pipes or headers 25 and 26 are the same and the risers or feed pipes 27 and 28 are also the same. Similarly the tube or nozzle 36 remains in its original state, but the valve element of Figure 5 is replaced by the one illustrated in Figure 10. This includes a solid bar portion 60 having a transverse opening 61 in its lower end and surmounted by a handle 62 having an opening 63 therein. A flange 64 similar to the flange 44 of Figure 5 is provided just below the handle portion and this is notched at 70 similar to the notch 50 in the flange 44 of the previously described valve unit. This notch 70 co-operates with the pin 51 in the upper end of the tube, spout or nozzle 36. Just below the flange 64 is an annulus 65 which positions an O-ring 66, and another O-ring 67 is on the lower end of the bar 60 between the flanges 68.

A valve element or semi-closure 69 is fitted on to the outside of an internal fill pipe or tube 71, and this operates in conjunction with the opening in the header 25, as best shown in Figure 9.

A notch 72 is formed in the upper end of the protuberance or semi-closure element 69 and this notch supports the upper curved end or loop 73 of a stirrup 74. A plug 75 is affixed to the lower end of the stirrup 74 and this fits into the lowermost opening or end of the tube 71, practically closing the same.

The tube 71 is transversely pierced at two places adjacent its lower end, these openings being at approximate right angles to each other, and the same have cross tubes 76 and 77 inserted therein, all as best shown in Figure 10. Each of these cross tubes is cut away or slotted at its lower face as shown at 78 to provide for better egress of the material forced through the opening 61 and the tube 71.

This material is preferably sherbet, fruit syrup or ice cream of a different flavor than the ice cream forced through the fill pipe 27, header 25 and outer portion of the nozzle 36. The sherbet or the like is indicated by the reference numeral 79 in Figures 14 and 15 and the ice cream itself is indicated by the reference numeral 80. The sherbet issuing from the nozzle ends or cross tubes 76 and 77 has a tendency to assume a sort of "four-leaf clover" shape with respect to the surrounding ice cream, as best shown by the dotted lines in Figure 15, but because the fill tube 36—71 is being moved upwardly during the filling operation, an actual vertical cross section of the filled cone or other receptacle 24 will be somewhat as illustrated in Figure 14.

Various modifications of shape, pattern and container may be employed, and the size and body of the injected materials with respect to volume depends upon the relative injection pressure and rate of withdrawal of the distributor head and nozzles.

Furthermore, it will be seen that with nozzles or distributor heads of various types, different patterns and numerous other more or less symmetrical radiating forms of inserts may be produced.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. A two-flavor filling unit for embodying center flavoring material in a predetermined pattern in an outer surrounding layer of ice cream or the like and injecting the combined materials into a container, said unit, comprising two concentric tubes, an adjusting valve between the tubes, means for forcing different types of material into the tubes and means for moving both tubes as a unit, toward and away from the container, the means for forcing the different materials into the tubes comprising headers, and flexible pipes connecting the headers to the different sources of supply, the headers emptying into the outer tube, but at different levels.

2. A device as described in claim 1, wherein an adjustable valve element is positioned in the outer tube between the openings thereinto from the headers.

3. A device as described in claim 2, wherein the adjustable valve element communicates with the inner tube of the upper header.

4. A device as described in claim 1, wherein a variegating feed means is provided in the inner tube.

5. A device as described in claim 4, wherein said variegated feed means comprises nozzles transverse of the tube and at right angles to each other.

6. A device as described in claim 5, wherein the lower end of the inner tube is maintained substantially closed.

7. A device as described in claim 6, wherein the closure element for the lower end of the tube comprises a plug and stirrup means on the tube for removably and loosely positioning the plug.

References Cited in the file of this patent
UNITED STATES PATENTS

| | | |
|---|---|---|
| 828,117 | Jenkins | Aug. 7, 1906 |
| 1,107,184 | Priban | Aug. 11, 1914 |
| 2,568,491 | Edwards | Sept. 18, 1951 |
| 2,670,116 | Johansen | Feb. 23, 1954 |
| 2,673,675 | Anderson | Mar. 30, 1954 |